Dec. 7, 1954     H. FORWALD     2,696,197
VALVE ARRANGEMENT IN COMPRESSED AIR CIRCUIT BREAKER
Filed July 10, 1951
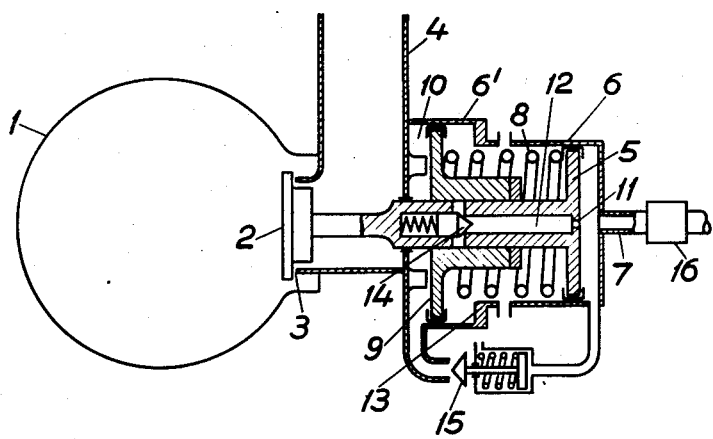
Inventor
Haakon Forwald
By [signature]
Attorney.

United States Patent Office 2,696,197
Patented Dec. 7, 1954

2,696,197

VALVE ARRANGEMENT IN COMPRESSED AIR CIRCUIT BREAKER

Haakon Forwald, Ludvika, Sweden, assignor to Allmanna Svenska Elektriska Aktiebolaget, Vasteras, Sweden, a Swedish corporation Application July 10, 1951, Serial No. 235,941

Claims priority, application Sweden August 5, 1950

1 Claim. (Cl. 121—38)

In compressed air circuit breakers it is important that the breaker system may be filled quickly with compressed air but after the extinction of the interruption arcs has been effected, the supply of compressed air may be considerably reduced, since only a lower pressure is required for maintaining the voltage insulation after the arcs have been extinguished. It is therefore of importance, that the extinguishing valve of compressed air breakers opens quickly and initially offers a large blowout opening for the compressed air, but the said opening then is minimized with a certain time delay.

The present invention relates to a simple arrangement for operating a compressed air breaker valve to obtain the aforementioned mode of operation.

The invention will be described with reference to the accompanying drawing wherein 1 designates diagrammatically a compresesd air contianer, and 2 a valve disc which is adapted to engage tightly against edges 3. Designated by 4 is a pipe line leading upwards to the breaker itself (not shown), and by 5 a main piston for operating the valve disc 2. The main piston 5 is movable within a cylinder 6 by means of operating air which is admitted by means of any valve means 16 through the pipe line 7 whereupon the valve 15 is closed. A spring 8 counteracts the movement of the piston under the influence of the compressed air. Furthermore, in an enlarged portion 6¹ of the cylinder 6 there is a piston 9 which moves to the right by the action of the compressed air led into the space 10, and thus moves the piston 5 to the right, whereby also the valve disc 2 is displaced to the right so that the valve opening is reduced. The space between the two pistons communicates with the atmosphere. As soon as operating air is delivered through the pipe 7, the piston 5 moves to the left and lifts the valve disc 2 so that the blow-out opening of the extinguishing valve becomes entirely opened.

When the piston 5 has reached its left-hand end position i. e. the valve disc 2 has reached its left-hand end position and the radial ports controlled by the check valve 14 are clear of the piston, air can stream in through a small throttle opening 11 within the piston 5 and through the passage 12 and the check valve 14 into the space 10 and operate the piston 9 so that it begins to move to the right, and since the piston 9 has greater diameter than the piston 5, the latter is returned to a position which is determined by the piston 9 engaging a shoulder 13. This return movement of the piston 5 occurs with a certain time delay, which is depending on the size of the opening 11 in the piston 5.

If the supply of compressed air to the breaker shall be interrupted, the supply of operating air to the pipe line 7 is interrupted, whereupon the valve 15 is opened by its spring so that the space 10 is evacuated quickly whereafter the piston 9 returns to its initial position and the spring 8 moves the piston 5 together with the valve disc 2 to the right so that the extinguishing valve is closed.

I claim as my invention:

A valve operator for air release valves for circuit breakers, comprising a cylinder having a pair of bores of different diameters, a main piston in the bore of smaller diameter, valve controlled means for supplying compressed air to the end of the cylinder having the smaller bore to move said piston in one direction, an auxiliary piston in said larger bore, a spring between said pistons urging them apart, a fluid pressure operated valve controlling a passage leading from the end of the cylinder having the larger bore to atmosphere, said valve being responsive to air pressure in the end of the cylinder having the smaller bore, an inner shoulder formed at the juncture of said bores limiting the movement of the auxiliary piston toward the main piston, a passage providing communication between the two ends of said cylinder and having a throttling means at its end adjacent the smaller bore and a check valve adjacent its opposite end for opening said passage when the main piston is moved to its end position by the compressed air to admit compressed air to the end of the cylinder having the larger diameter bore to move the auxiliary piston to said shoulder to return said main piston to a point near its initial position.

References Cited in the file of this patent

UNITED STATES PATENTS

| Number | Name | Date |
|---|---|---|
| 1,912,024 | Uebermuth | May 30, 1933 |
| 2,100,485 | Lindemann | Nov. 30, 1937 |
| 2,380,817 | Woolard | July 31, 1945 |
| 2,403,328 | Banning | July 2, 1946 |
| 2,415,783 | Bassett et al. | Feb. 11, 1947 |